(12) United States Patent
Piradi

(10) Patent No.: US 11,551,560 B2
(45) Date of Patent: Jan. 10, 2023

(54) ENHANCED FLIGHT NAVIGATION DETERMINATION

(71) Applicant: The Boeing Company, Chicago, IL (US)

(72) Inventor: Prasad Rao Piradi, Chicago, IL (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 16/585,597

(22) Filed: Sep. 27, 2019

(65) Prior Publication Data

US 2021/0097869 A1    Apr. 1, 2021

(51) Int. Cl.
G08G 5/00 (2006.01)
G01C 21/20 (2006.01)
G08G 5/04 (2006.01)

(52) U.S. Cl.
CPC ........... *G08G 5/0039* (2013.01); *G01C 21/20* (2013.01); *G08G 5/045* (2013.01)

(58) Field of Classification Search
CPC ....... G08G 5/0039; G08G 5/045; G01C 21/20
See application file for complete search history.

(56) References Cited

U.S. PATENT DOCUMENTS

| | | | |
|---|---|---|---|
| 6,995,690 B1 | 2/2006 | Chen | |
| 7,302,318 B2 | 11/2007 | Gerrity | |
| 8,065,043 B2 | 11/2011 | Gremmert | |
| 8,073,578 B1 * | 12/2011 | McCusker | G08G 5/0039 701/8 |
| 8,332,083 B1 | 12/2012 | McCusker | |
| 2016/0236790 A1 * | 8/2016 | Knapp | G08G 5/0021 |
| 2021/0020049 A1 * | 1/2021 | Nathan | G08G 5/0021 |
| 2021/0247764 A1 * | 8/2021 | Liu | B64C 39/024 |

OTHER PUBLICATIONS

Bailey, Larry L. et al., "Controlled Flight Into Terrain: A Study of Pilot Perspectives in Alaska," Office of Aviation Medicine, U.S. De[paratment of Transportation, Federal Aviation Administration, dated Aug. 2000, 50 pages.

(Continued)

*Primary Examiner* — Ig T An
(74) *Attorney, Agent, or Firm* — McDonnell Boehnen Hulbert & Berghoff LLP

(57) ABSTRACT

Examples for flight navigation determination are presented herein. An example may involve obtaining a target destination for an aircraft and determining an initial flight path between a current location and the target destination. The flight path may include a series of waypoints for guiding navigation. The example may further involve obtaining terrain information that represents elevations of obstacles along the initial flight path and modifying the initial flight path to generate a revised flight path using the terrain information. The revised flight path may include modifications to the series of waypoints of the initial flight path such that navigation of the revised flight path avoids obstacles positioned along the initial flight path. The obstacles may have an elevation that exceeds an adjustable threshold elevation that depends on the initial flight path. The example may further involve providing the revised flight path to a navigation system of the aircraft.

20 Claims, 10 Drawing Sheets

(56) References Cited

OTHER PUBLICATIONS

Kramer, Lynda J. et al., "Synthetic Vision Enhances Situation Awareness and RNP Capabilities for Terrain-Challenged Approaches," AIAA's 3rd Annual Aviation Technology, Integration, and Operations (ATIO) Tech. dated Nov. 2003, 11 pages.

Arthur III, Jarvis J. et al., "Flight Simulator Evaluation of Synthetic Vision Display Concepts toPrevent Controlled Flight INto Terrain (CFIT)," NASA/TP-2004-213008, available at https://ntrs.nasa.gov/search.jsp?R=200400581052017-11-11T12:07:52+00:00Z, 127 pages.

Campbell, Jacob et al., "Light Detection and Ranging-Based Terrain Navigation A Concept Exploration," Institute of Navigation GPS/GNSS Conference, dated Sep. 2003, 9 pages.

Tubb, Nicholas A., "Enhanced Ground Proximity Warning System (EGPWS) Overrun Warning Terrain Database Analysis," Boeing Avionics Systems (66-CB-E125) dated Dec. 2016, 25 pages.

\* cited by examiner

ENHANCED FLIGHT NAVIGATION DETERMINATION

FIELD

The present disclosure relates generally to flight navigation path determination for an aircraft, and more particularly to flight navigation path determination that involves identifying and avoiding elevated obstacles in the underlying terrain.

BACKGROUND

Flight planning involves the development of a flight plan that sets forth a proposed path for an aircraft to follow from a current location to a target destination. When planning a flight for an aircraft to follow, the flight plan generator may factor a variety of information, such as the total distance to the target destination, the amount of fuel required to complete the route, weather conditions of areas along the route, abilities of the aircraft, and air traffic control requirements. For instance, the flight plan generator may use fuel calculations when crafting a flight plan to ensure that the aircraft can safely reach the destination while minimizing the aircraft's overall weight and the cost of the flight. As such, the flight plan generator may design each flight plan such that the path suits the abilities of the aircraft navigating the flight, avoids undesirable weather conditions, and complies with air traffic control requirements.

SUMMARY

In one example, a system for flight navigation path determination of an aircraft is described. The system includes a database having terrain information and a computing device. The computing device is configured to obtain an indication of a target destination for the aircraft and determine an initial flight path between a current location of the aircraft and the target destination responsive to obtaining the indication. The initial flight path includes a series of waypoints for guiding navigation of the aircraft along the initial flight path. The computing device is further configured to obtain the terrain information that represents elevations of obstacles along the initial flight path based on the initial flight path. The computing device is also configured to modify, using the terrain information, the initial flight path to generate a revised flight path. The revised flight path includes one or more modifications to the series of waypoints of the initial flight path such that navigation of the revised flight path avoids one or more obstacles positioned along the initial flight path. The one or more obstacles have an elevation that exceeds an adjustable threshold elevation that depends on the initial flight path. The computing device is also configured to provide the revised flight path to a navigation system of the aircraft.

In another example, a method for flight navigation path determination is described. The method includes obtaining, at a computing system, an indication of a target destination for an aircraft, and responsive to obtaining the indication, determining an initial flight path between a current location of the aircraft and the target destination. The initial flight path includes a series of waypoints for guiding navigation of the aircraft along the initial flight path. The method further includes obtaining, by the computing system, terrain information that represents elevations of obstacles along the initial flight path based on the initial flight path and modifying, by the computing system using the terrain information, the initial flight path to generate a revised flight path. The revised flight path includes one or more modifications to the series of waypoints of the initial flight path such that navigation of the revised flight path avoids one or more obstacles positioned along the initial flight path. The one or more obstacles have an elevation that exceeds an adjustable threshold elevation that depends on the initial flight path. The method further includes providing, by the computing system, the revised flight path to a navigation system of the aircraft.

In an additional example, a non-transitory computer-readable medium is described. The non-transitory computer-readable medium is configured to store instructions, that when executed by one or more processors, cause a computing system to perform functions. The functions include obtaining an indication of a target destination for an aircraft, and responsive to obtaining the indication, determining an initial flight path between a current location of the aircraft and the target destination. The initial flight path includes a series of waypoints for guiding navigation of the aircraft along the initial flight path. The functions further include, based on the initial flight path, obtaining terrain information that represents elevations of obstacles along the initial flight path. The functions also include modifying, using the terrain information, the initial flight path to generate a revised flight path. The revised flight path includes one or more modifications to the series of waypoints of the initial flight path such that navigation of the revised flight path avoids one or more obstacles positioned along the initial flight path. The one or more obstacles have an elevation that exceeds an adjustable threshold elevation that depends on the initial flight path. The functions may also include providing the revised flight path to a navigation system of the aircraft.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
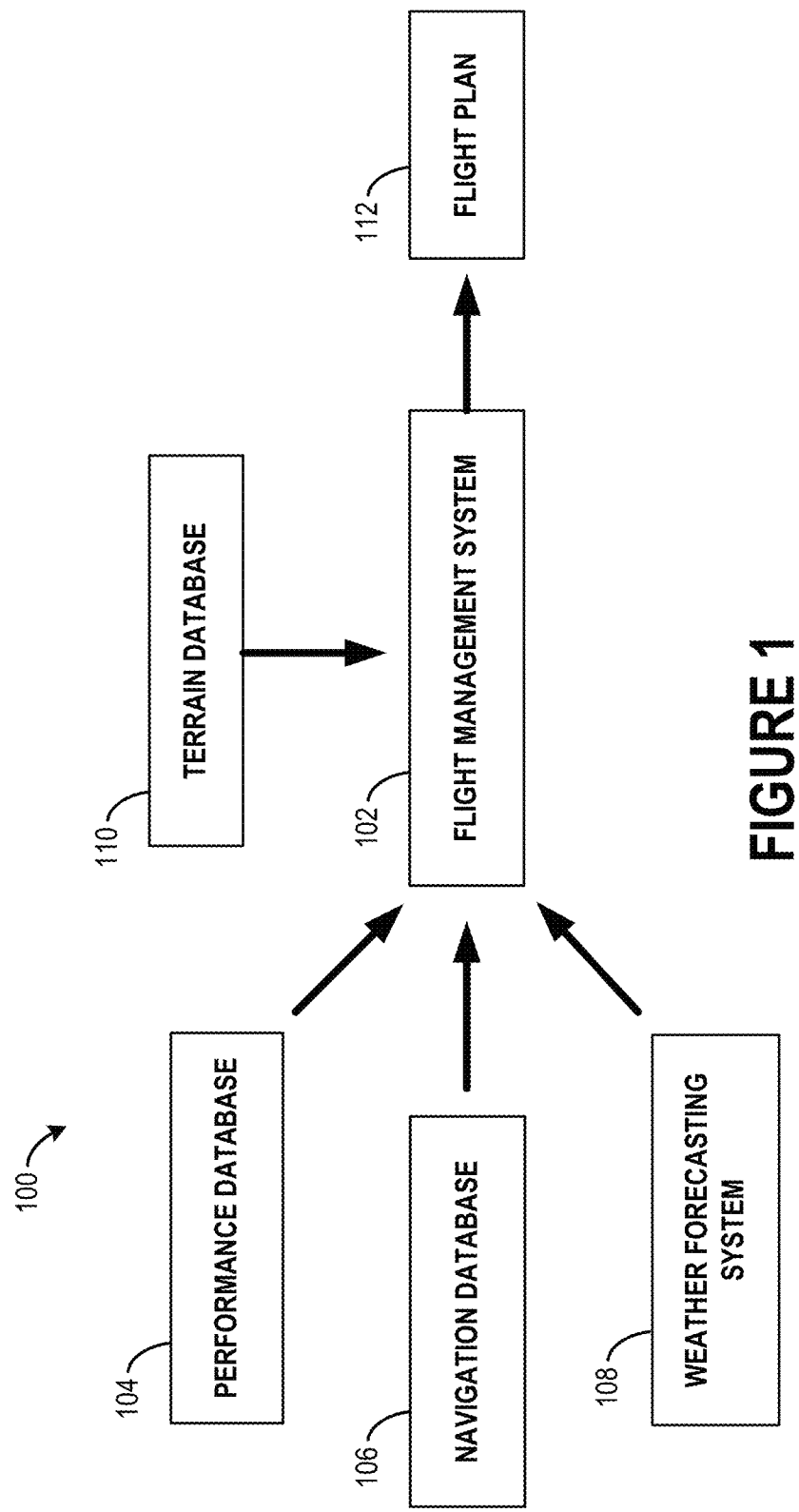
FIG. 1 is a block diagram of a system configured for flight navigation path determination, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Flight plans are generated for aircrafts to follow when navigating to target destinations. Each flight plan may be crafted to fit the parameters of the aircraft utilizing the plan and may provide information for use by the aircraft's pilots and the local Civil Aviation Authority (CAA) (e.g., the Federal Aviation Administration (FAA) in the United States) for overseeing flights in a way that minimizes collisions. The information associated with a flight plan may include departure and arrival points (e.g., target airport), estimated time en route, alternate airports in case of bad weather, number of people on board, and other information about the aircraft itself. As such, the route defined within the flight plan, also referred to herein as flight path, may specify a permitted path for the aircraft to follow and may use a series of waypoints to guide navigation along the path. Waypoints may serve as periodic indicators that are spaced in way to enable a pilot or a navigation system to follow to ensure that the aircraft navigates along the specified path.

When constructing a flight plan, a flight plan generator may factor different information, such as the abilities of the aircraft (e.g., type of engine, weight of aircraft), the anticipated weather conditions for areas along the route, and zones that the aircraft is permitted to fly over. The different information may help construct a particular path that enables efficient navigation to the target destination while also minimizing cost. For instance, the flight plan generator may consider and factor weather elements (e.g., the wind, temperature) for areas traversed during the flight since weather variations can drastically impact aircraft's navigation especially during take-offs and landing. Further, by utilizing information about the aircraft (e.g., weight, engine type), the flight plan generator may be able to construct a flight path suitable for the aircraft while also minimizing the cost to perform the flight.

To enable navigation of a flight plan by an aircraft, the aircraft's navigation system may include a flight management system (FMS). The FMS is configured to assist with navigation of the aircraft according to the parameters presented within the flight plan. As a component of the avionics of an aircraft, the FMS is a specialized computing system that can automate a wide variety of inflight tasks and reduce the workload on the flight crew (e.g., pilots). In particular, a primary function performed by the FMS is overall management of the flight plan. Managing the flight plan may involve using aircraft sensor measurements, such as measurements from the aircraft's global positioning system (GPS), inertial navigation system (INS), and radio navigation, to determine the aircraft's position in order to help guide the aircraft along the flight plan. For instance, the FMS may help a pilot follow waypoints set forth within the flight plan. In some instances, the FMS may also help automatically navigate the aircraft according to the waypoints of the flight plan.

The FMS may help guide the aircraft using the input and display interfaces of the aircraft's navigation system. For instance, the FMS may display a visual representation of the flight plan for pilots to follow on one of the navigation system's display interface. An example visual representation associated with a flight plan may display an overview of areas traversed during the flight path along with visual indicators of the different waypoints that can be used to guide the aircraft. The visual representation can be used to display other information for the pilot to utilize, including altitude measurements, temperature readings, and distances to waypoints, etc. The visual representation may also be used to provide alerts to inform the pilots of detected events during navigation of the flight plan. The FMS may also be configured to receive and accommodate inputs from the pilot. For instance, the FMS may adjust the visual representation or modify aspects of the flight plan (e.g., the flight path) in response to inputs provided by the pilot.

Although flight plans can assist with aircraft navigation and minimize air-traffic issues between aircrafts, each flight plan is typically generated without substantial consideration given to the underlying terrain flown over during navigation of the flight path. In particular, a FMS traditionally predicts flight paths from waypoint to waypoint with little to no knowledge on altitudes between these waypoints, especially in valley or hilly areas. Rather, pilots might depend on other aircraft systems for terrain awareness and warnings, such as the enhanced ground proximity warning system (EGPWS) and the terrain awareness and warning system (TAWS). These systems are designed to provide tactical warning information about the surrounding terrains during navigation. The warnings, however, are often delivered to the pilots with minimal time for the pilot to determine a safe course of action to avoid the potential obstacle. In fact, despite the increased sophistication of newer EGPWS installations, the average warning time provided by either system might be quite short (e.g., 15 seconds notice) depending upon the alert mode that triggers the system to provide the warning.

Thus, for at least the reasons above, it is desirable for an aircraft's navigation system to be able to identify elevation of terrain in advance of the aircraft approaching the terrain so as to enable the pilot to modify navigation to avoid the terrain. Further, it would be beneficial for the system to be capable of constructing and proposing an alternative route that assists the pilot to avoid the terrain during navigation of the aircraft.

Example implementations presented herein describe systems and methods for determining and executing a flight plan that incorporates terrain detection and avoidance throughout the entire flight. In some examples, a flight plan generator may utilize terrain information when initially generating the flight plan for an aircraft to navigate. For instance, a FMS or another flight path generator may use information from a terrain database to supplement other sources when constructing the flight plan. The terrain information may specify the location and elevation of elevated obstacles, such as the elevations of hills, mountains, and other elevated terrain. For instance, the terrain information may include a compilation of multiple elevation maps. The terrain information may also include information that specifies elevations of man-made obstacles, such as buildings, bridges, etc. As such, the FMS may utilize the terrain information to develop a flight path that avoids elevated obstacles positioned in between the current location of the aircraft and the target destination.

The flight plan generator (e.g., a computing system or the FMS of an aircraft) may also be configured to modify an existing flight plan to avoid potential obstacles detected via an analysis of the underlying terrain of the route. Particularly, the flight plan may be modified prior to take off based on updated information, such as new expected weather conditions for one or more areas traversed or to incorporate adjustments that avoid elevated terrain (e.g., elevated hills, mountains, valleys, and man-made objects). For instance, the FMS may obtain a flight plan for an aircraft and responsively analyze the path for potential obstacles in the underlying terrain.

The flight plan may also be modified in-real time during flight. For example, the FMS may modify the path mid-flight in real-time to avoid upcoming potential obstacles, such as elevated terrain that appears to be within the current path of the aircraft (or within a threshold range of the current path). The real-time modifications may be necessary in response to detecting changes in weather conditions or other factors that may increase the potential of interference by one or more elevated obstacles with the current path of the aircraft (e.g., switching target airports).

As such, the techniques presented herein may critically increase safety during flight operations, including during flights at night, in undesirable weather conditions (e.g., high winds), and in low visibility situations. In some cases, the techniques may also help avoid elevated terrain in other situations, such as during cockpit distractions, ATC errors or miscommunication between a pilot and ATC. The techniques may also enable warning pilots with substantial time (e.g., 5 minutes, 10 minutes) to avoid upcoming terrain and other undesirable situations.

Some examples implementations may involve an initial detection of a possible conflict between the aircraft's flight path and the underlying terrain. During navigation, the FMS may utilize aircraft sensor measurements and terrain information to continuously monitor for elevated terrain located in the aircraft's current flight path. This way, the FMS may detect situations where a modification to the flight path may be necessary. For instance, high winds, changes in the destination airport or other changes in the current flight path, and other situations can increase the likelihood of one or more elevated obstacles (e.g., elevated terrain) interfering with the current flight path of the aircraft. As such, the FMS may detect such a situation and responsively modify the flight path to achieve a safe course that avoids the terrain. For instance, the FMS may detect an upcoming potential obstacle in the terrain and adjust one or more waypoints to cause the flight path to now avoid the obstacle (e.g., circumvent or fly over the obstacle). In some examples, the FMS may be configured to automatically adjust the flight path such the revised flight path avoids the obstacle. For instance, the FMS may develop a revised flight path that incorporates modifications to avoid potential terrain interference while still accommodating the target destination and abilities of the aircraft.

In some examples, the FMS may detect that the likelihood of elevated terrain being within a path of the aircraft increased above a threshold likelihood during navigation. Although the location of the elevated terrain may not be imminent, the FMS may be configured to alert the pilot and propose an alternative route that maintains a safe buffer away from elevated terrain. Thus, the FMS may maintain the likelihood of elevated terrain interfering with the flight path of the aircraft below the threshold likelihood.

When monitoring for the terrain for potential elevated obstacles that may interfere the current flight path, the FMS may be configured to provide alerts to the pilot in cases where elevated terrain is detected in the current path or within a threshold range of the current path of the aircraft. Each alert may contain a variety of information to help the aircraft maintain a buffer from elevated terrain and can be provided using different techniques. For instance, the aircraft's navigation system may provide visual alerts (e.g., text-based descriptions), audio alerts (e.g., beeps, pre-recorded voice alerts), tactile alerts (e.g., rumble the seat or an input interface), or a combination of the different types.

The FMS may use the alerts to convey information to the pilots, such as detected undesirable weather conditions, a detection of elevated terrain that may interfere with the aircraft's current flight path, or to inform of proposed or automatic changes to the flight plan. For instance, the FMS may detect an upcoming situation wherein the aircraft may navigate closely to underlying terrain. In such a situation, the FMS may provide alerts to the pilots as soon as the situation is detected, which should provide enough time for the pilots to make adjustments. For instance, the FMS may issue alerts upon initial detection and periodic alerts until detecting that the pilot modified the aircraft's current path. The FMS may also alert the pilot of a proposed modification to the current flight path relieving the pilot of the duty of determining the safe, alternative route. Particularly, the FMS may develop the proposed modification based on an analysis of the terrain and other factors, such as expected weather conditions of upcoming areas during the route and a status of the aircraft's current fuel situation.

As indicated above, the FMS may be configured to construct one or more alternative routes in situations that elevated terrain may interfere with the current route of the aircraft. In some examples, the FMS may be configured to automatically adjust the current flight path to incorporate an alternative route that allows for safe navigation. The amount that the alternative route varies from the current flight path can depend on the particular situation, including the underlying terrain of nearby areas. The FMS may be configured to enable the pilots to enable and disable the automatic adjustment feature. Alternatively, the FMS may be configured to propose the one or more alternative routes to the pilots with sufficient time (e.g., 2 minutes, 5 minutes, 15 minutes), for the pilots to review and accept or reject. Upon receiving approval, the FMS may implement the modifications and display the revised flight path via a display interface for the pilot to follow.

The FMS or another computing system (e.g., a navigation system) may modify a flight path in various ways to avoid detected potential obstacles. For instance, the FMS may adjust (or propose adjusting) the flight path using one or more lateral modifications such that the aircraft navigates around the potential obstacle. The FMS may also adjust (or propose adjusting) the flight path vertically such that the aircraft navigates at a different altitude that avoids the potential obstacles (i.e., adjusts a vertical path of the aircraft). In some examples, the FMS may be configured to modify the flight path in other ways, such as using a combination of lateral and vertical modifications to modify the vertical and lateral path of the aircraft. As such, the FMS may factor a variety of information when determining the flight path modifications, such as expected weather conditions of the upcoming areas, the type of aircraft and engine of the aircraft, the current fuel status of the aircraft, and the availabilities of airports relative to the target destination.

In further examples, the FMS may communicate with a system configured to autonomously or semi-autonomously control the aircraft according to the flight plan. Thus, rather than proposing changes to the aircraft's current flight path to the pilots, the FMS may transmit the changes to the system for autonomous execution. In some examples, the FMS may operate as part of the autonomous or semi-autonomous navigation system of the aircraft. In turn, the FMS or another computing device may automatically cause the aircraft to navigate a route that maintains a safety buffer away from elevated terrain, including during situations where navigation conditions are less than ideal (e.g., high winds, low visibility).

Referring now to the Figures, FIG. 1 is a block diagram of a system 100 for flight navigation determination, according to an example implementation. The system 100 includes a FMS 102, a performance database 104, a navigation database 106, a weather forecasting system 108, a terrain database 110, and a flight plan 112. These components are included to illustrate an example configuration for the system 100, but other configurations may include more or fewer components. In other examples, one or more components may be part of the FMS 102. For instance, the FMS 102 may include the performance database 104 and the navigation database 106 within internal memory of the FMS 102. Similarly, in another example, the performance database 104 and the navigation database 106 may exist and operate as a single database. Further, each component may be further divided into multiple sub-components. Additional configurations are described below.

Within the system 100, the FMS 102 is configured to manage a flight plan 112 for an aircraft. The FMS 102 may be one or more computing systems that operate as part of the aircraft's avionics. In some examples, operations of the FMS 102 may be performed by one or more computing systems associated with an overall navigation system of the aircraft.

The FMS 102 may manage the flight plan 112 using various operations, such as generating all or a portion of the flight plan 112 or modifying all or a portion of the flight plan 112. The flight plan 112 specifies a proposed path for navigation of the aircraft between a current location of the aircraft and a target destination. As such, the flight plan 112 may utilize a series of waypoints that help guide navigation of the aircraft between intermediate locations that lie between the aircraft's current location and target destination.

In some examples, the FMS 102 may develop and produce the flight plan 112 for the aircraft to navigate. The FMS 102 may factor information when initially constructing the flight plan 112, such as the current location and target destination for the aircraft, the abilities of the aircraft (e.g., the type of engine of the aircraft, amount of fuel available, the weight of the aircraft), expected weather conditions, and the underlying terrain, among others. Alternatively, the FMS 102 may receive the flight plan 112 from another system (e.g., a flight plan generation system). As such, the FMS 102 may manage the flight plan 112 in various ways, such as generating the flight plan 112 (or a portion of the flight plan 112) or modifying the flight plan 112 utilizing data from one or more components of the system 100.

The FMS 102 may help guide the aircraft along the flight plan 112. From the cockpit of the aircraft, the FMS 102 may be controlled through an interface, such as a Control Display Unit (CDU) that incorporates a visual display interface and input interface (e.g., keyboard, touchscreen). Other types of interfaces may be used by the FMS 102 to convey information to the pilot as well. As such, the FMS 102 may enable pilots to use and view the flight plan 112 during navigation of the aircraft.

In some examples, the FMS 102 may display the flight plan 112 as a visual representation. The visual representation may convey information to the pilots of the aircraft, such as locations of the waypoints, the altitudes to navigate between waypoints, navigation conditions (e.g., outside temperature), and potential obstacles. As such, the FMS 102 may use the visual representation to also provide alerts to the pilots. The alerts may take the form of visual or audiovisual alerts. An example alert may include an audio alert that obtains the attention of the pilots along with text that conveys an upcoming obstacle or a modification to the existing flight path. For instance, an alert may specify details regarding a situation in a text format, such as the location of an elevated obstacle and how to avoid the situation. Alerts may have other configurations within examples.

To develop and manage the flight plan 112, the FMS 102 may communicate with other components of the system 100, such as the performance database 104, the navigation database 106, the weather forecasting system 108, and the terrain database 110. The FMS 102 may communicate with other components in other examples. In some examples, one or more of these components may be part of the FMS 102 (e.g., a database may exist in memory associated with the FMS 102). As such, the FMS 102 may communicate with these components to obtain information that can be used to develop the flight plan 112.

The performance database 104 may be used by the FMS 102 to manage performance of the aircraft. The performance of the aircraft may be managed with respect to the flight plan 112. In some examples, the performance database 104 may convey limitations associated with operation of the aircraft. The limitations may depend on the size, weight, fuel capacity, and engine type of the aircraft.

The navigation database 106 may contain the elements from which the flight plan 112 is constructed. For instance, the navigation database 106 may convey maps and routes available for constructing the flight plan 112. These elements may be defined via the ARINC 424 standard. The information within the navigation database 106 may be updated routinely to ensure that its contents are current. In some examples, the navigation database 106 may include information related to waypoints, airways, radio navigation aids (e.g., distance measuring equipment (DME), VHF omnidirectional range (VOR), non-directional beacons (NDBs), and instrument landing systems (ILSs), airports, runways, standard instrument departure (SID), standard terminal arrival (STAR), holding patterns, instrument approach procedure (IAP), and other possible data.

The weather forecasting system 108 may provide weather-related information to the FMS 102. Weather-related information may include expected weather conditions of one or more areas associated with a predicted flight path for the aircraft. For example, the FMS 102 may utilize expected weather conditions to avoid undesirable weather conditions, such as high winds, rain or snowy conditions. The FMS 102 may also use weather information from weather forecasting system 108 to avoid undesirable weather events, such as tornados, hurricanes, typhoons, etc. In some instances, the FMS 102 may use expected or detected weather conditions to modify the flight plan 112 in real-time. For instance, high winds or other undesirable weather conditions may increase the chances of elevated terrain interfering with the current flight path as the aircraft navigates. As a result, the FMS 102 may modify the flight plan 112 upon detecting undesirable weather conditions to ensure that the aircraft is following a safe flight path that avoids elevated terrain.

The communication between the FMS 102 may be one-way or two-way communication within examples. For instance, the FMS 102 may have access to information stored on each database and from the weather forecasting system 108 without the databases and the weather forecasting system 108 having access to information associated with the FMS 102. In some examples, the FMS 102 may use two-way communication with these components, which may involve transmitting queries to each component and receiving information in response. For example, the FMS 102 may transmit a query to the weather forecasting system 108 for expected weather conditions that occur across areas between a current location of the aircraft and a target destination during an expected time frame for the performance of this flight. In other examples, the FMS 102 may obtain expected weather conditions in real-time from weather forecasting system 108 to enable adjustments to the flight plan to be made to avoid undesirable weather conditions. The FMS 102 may also supplement information from components in the system 100 with aircraft sensor measurements and input provided from other sources (e.g., ATC).

Figure 2:
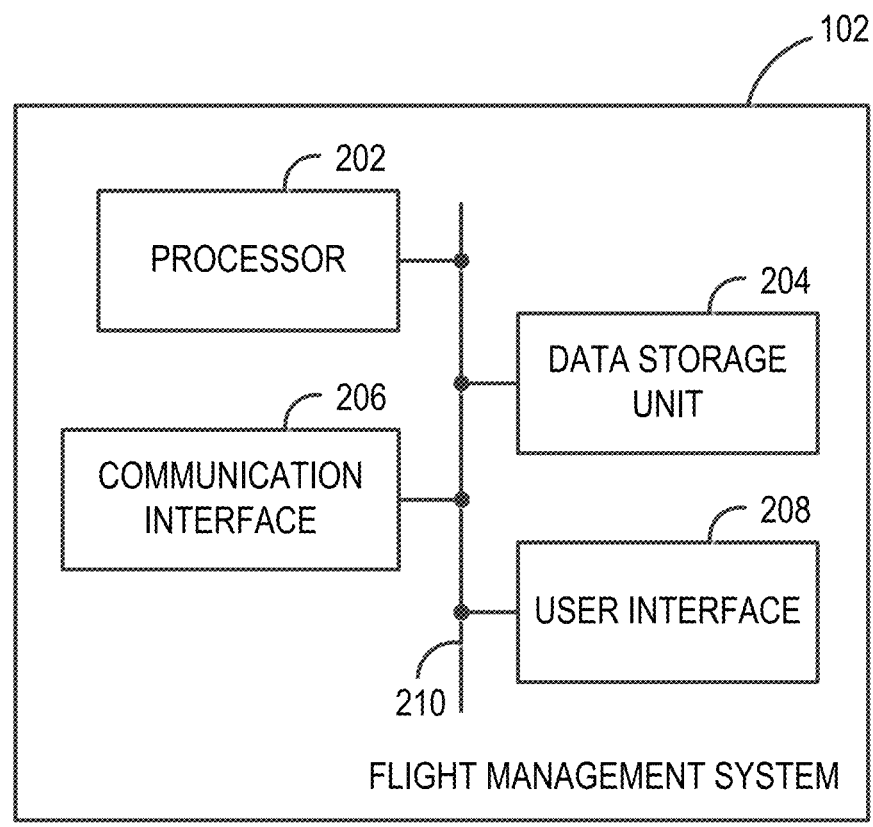
FIG. 2 is a block diagram of a flight management system, according to an example implementation.

FIG. 2 is a block diagram of the FMS 102, according to an example implementation. The FMS 102 may perform various acts and/or functions, such as those described in this disclosure. The FMS 102 may include components, such as a processor 202, a data storage unit 204, a communication interface 206, and a user interface 208. The components can be connected to each other (or to another device, system, or other entity) via a connection mechanism 210, and can include more or less components in other example implementations. In addition, the FMS 102 may involve multiple computing devices operating within a network.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The FMS 102 may operate on board an aircraft. For instance, the FMS 102 may operate as part of the aircraft's navigation system. In other examples, the FMS 102 may be physically separate from the aircraft. The FMS 102 may communicate with the aircraft to provide the navigation a flight path that avoids elevated terrain. For instance, the FMS 102 may communicate with the navigation system of the aircraft in real-time and provide modifications to the flight path as necessary through the flight. In other examples, the FMS 102 may generate and produce a flight path for the aircraft prior to the aircraft initiating flight.

In some examples, the FMS 102 may generate optimized flight paths for multiple aircrafts. For instance, the FMS 102 may be located at airport and provide optimized flight paths for multiple aircrafts traveling away from or towards the airport. The FMS 102 may be part of a network of flight management systems that help determine flight navigation between multiple airports.

The FMS 102 may be configured to detect potential obstacles and other undesirable conditions using real-time sensor measurements from various aircraft sensors. For instance, the FMS 102 may adjust the path of flight for the aircraft in real-time in response to detecting elevated terrain within a threshold range of the current flight path or other unfavorable navigation conditions (e.g., low visibility, poor weather conditions). The FMS 102 may also be configured to use information from other sources, such as ATC or from other aircrafts.

The processor 202 may represent one or more general-purpose processors (e.g., a microprocessor) and/or one or more special-purpose processors (e.g., a digital signal processor (DSP)). As such, the processor 202 may include a combination of processors within examples. The processor 202 may perform operations, including processing data received from the other components within the FMS 102 and data obtained from external sources, such as the performance database 104, the navigation database 106, the weather forecasting system 108, and the terrain database 110.

The data storage unit 204 may include one or more volatile, non-volatile, removable, and/or non-removable storage components, such as magnetic, optical, or flash storage, and/or can be integrated in whole or in part with the processor 202. As such, the data storage unit 204 may take the form of a non-transitory computer-readable storage medium, having stored thereon program instructions (e.g., compiled or non-compiled program logic and/or machine code) that, when executed by the processor 202, cause the FMS 102 to perform one or more acts and/or functions, such as those described in this disclosure. Such program instructions can define and/or be part of a discrete software application. In some instances, the FMS 102 can execute program instructions in response to receiving an input, such as from the communication interface 206 or the user interface 208. The data storage unit 204 may also store other types of data, such as those types described in this disclosure.

In some examples, the data storage unit 204 may serve as a local storage for information obtained from one or more external sources. For example, the data storage unit 204 may store information obtained from the performance database 104, the navigation database 106, the weather forecasting system 108, and the terrain database 110. The FMS 102 may access stored information from the data storage unit 204 when generating an optimized flight path for an aircraft.

The communication interface 206 can allow the FMS 102 to connect to and/or communicate with another other entity according to one or more protocols. In an example, the communication interface 206 can be a wired interface, such as an Ethernet interface or a high-definition serial-digital-interface (HD-SDI). In another example, communication interface 206 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission. The communication interface 206 may also utilize other types of wireless communication to enable communicating with one or more aircrafts. In some examples, the communication interface 206 may enable communication between the FMS 102 and components within the system 100.

The user interface 208 can facilitate interaction between the FMS 102 and an administrator or user (e.g., a pilot or ATC), if applicable. As such, the user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 208 can include hardware and/or software components that facilitate interaction between the FMS and the user of the system.

The user interface 208 may utilize one or more displays positioned on one or more aircrafts. When the FMS 102 is positioned on an aircraft, the user interface 208 may be components of the aircraft's navigation system. Particularly, the FMS 102 may display and enable operation of flight plans (e.g., an initial flight plan and revised flight plans) and other information for the aircraft using the navigation system. The pilots may interact with the FMS 102 via the user interface 208, including approving and reviewing modifications to the flight plan 112.

Figure 3:
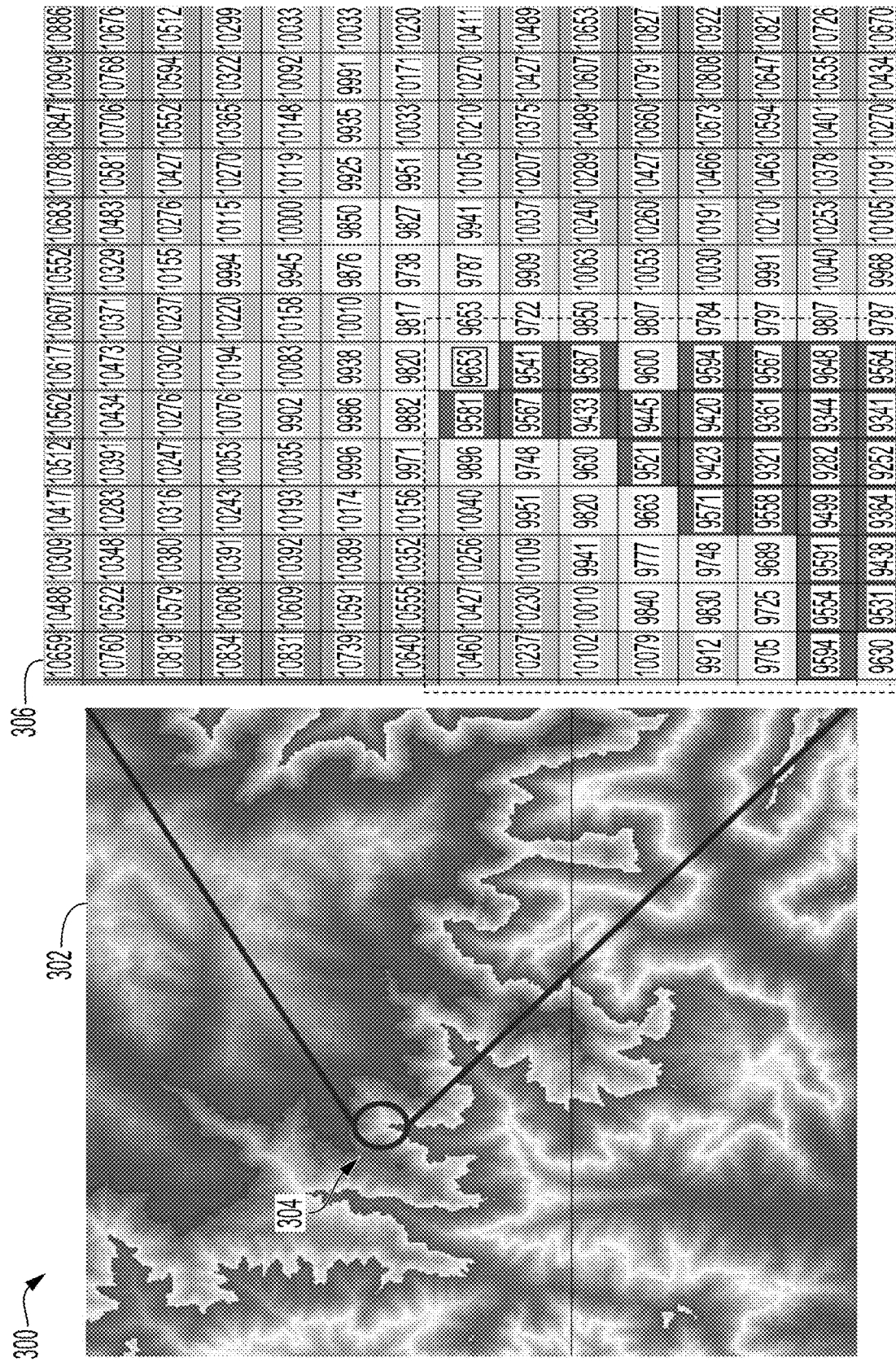
FIG. 3 illustrates terrain information, according to an example implementation.

FIG. 3 illustrates terrain information, according to an example implementation. The terrain information 300 includes a digital elevation model (DEM) 302 and a grid 306 that represents the data in the DEM 302 in a grid format. The terrain information 300 is illustrated to depict one example. In other examples, the terrain information 300 may depict the elevations of potential obstacles in other ways.

The terrain information 300 may be used by the FMS 102 to generate an optimized flight plan for an aircraft. Particularly, the optimized flight plan may specify a flight path for the aircraft to navigate between a current location of the aircraft and a target destination. In some implementations, the flight path may incorporate and use a series of waypoints to guide navigation of the aircraft. For instance, a pilot may provide controls to navigate the aircraft along the waypoints. As such, the flight path may convey provide a vertical (e.g., elevation) and lateral path such that the aircraft avoids potential obstacles in the underlying terrain as specified by the terrain information 300.

The terrain information 300 may be stored and provided by the terrain database 110 in the system 100. As such, the FMS 102 may access the terrain information 300 stored in the terrain database 110 to generate and optimize the flight plan 112 for an aircraft. In some examples, the FMS 102 may use the terrain information 300 when initially developing the flight plan 112. Alternatively, the FMS 102 may monitor and use the terrain information 300 during navigation of the flight plan 112 to identify potential obstacles that may arise due to real-time conditions. The FMS 102 may use the terrain information 300 to modify the flight plan 112 when determining alternative routes for avoiding potential obstacles as well.

As shown in FIG. 3, the terrain information 300 can be conveyed in different forms. Particularly, the terrain information 300 includes the DEM 302, which represents the elevations of the terrain within particular areas. In particular, the DEM 302 may be a 3D computer graphics representation of a terrain's surface created from the terrain's elevation data. In some examples, the DEM 302 conveys obstacle data procured from various sources, such as government and commercial agencies. The obstacle data may indicate locations and elevations for different obstacles, such as elevated terrain that could potentially interfere with aircraft navigation. Many of the obstacles may have locations near an airport since aircrafts descend and land at airports.

The grid 306 may convey particular elevations in an organized manner for the FMS 102 to utilize. Particularly, the grid 306 is shown depicting the different elevations of terrain in area 304 represented in the DEM 302 in a grid format that includes numerous cells arranged to represent the elevation and location of obstacles. In some examples, the grid 306 may convey the elevations of potential obstacles that include both natural terrain obstacles and man-made obstacles (e.g., buildings, bridges, etc.).

In some examples, the grid 306 may specify elevations of obstacles in the terrain in ASCII and use feet as the unit of measurement. Alternatively, other ways may be used to convey the elevations of obstacles. Elevations of the terrain (and other obstacles) across a given latitude may be grouped on the same line in the grid 306 with columns proceeding from west to east and rows representing terrain from north to south. If the elevation value for a cell is not available, then the elevation value may have a default value (e.g., −8000 feet). The elevation scale factor may be predefined (e.g., 1 foot).

The grid 306 may exclude terrain if obstacles in the terrain fail to meet a threshold elevation. For instance, the grid 306 may exclude an obstacle if the elevation for the obstacle above mean sea level (MSLHT) is less than or equal to the elevation contained in the corresponding high resolution terrain database cell. The grid 306 may also exclude obstacles if the elevation of the obstacle above ground level (AGLHT) is less than a threshold (e.g., 100 feet). In cases where more than one obstacle occupies the same cell in the grid 306, the obstacle with the highest MSHT may be used and represented by the grid 306 for that location. In some examples, obstacles may be included within the grid 306 when the obstacles exceed an adjustable threshold. The adjustable threshold may depend on altitudes that the flight plan 112 plans for the aircraft to navigate. As such, the adjustable threshold elevation can depend a set of elevations associated with navigation of the initial flight path.

Figure 4:
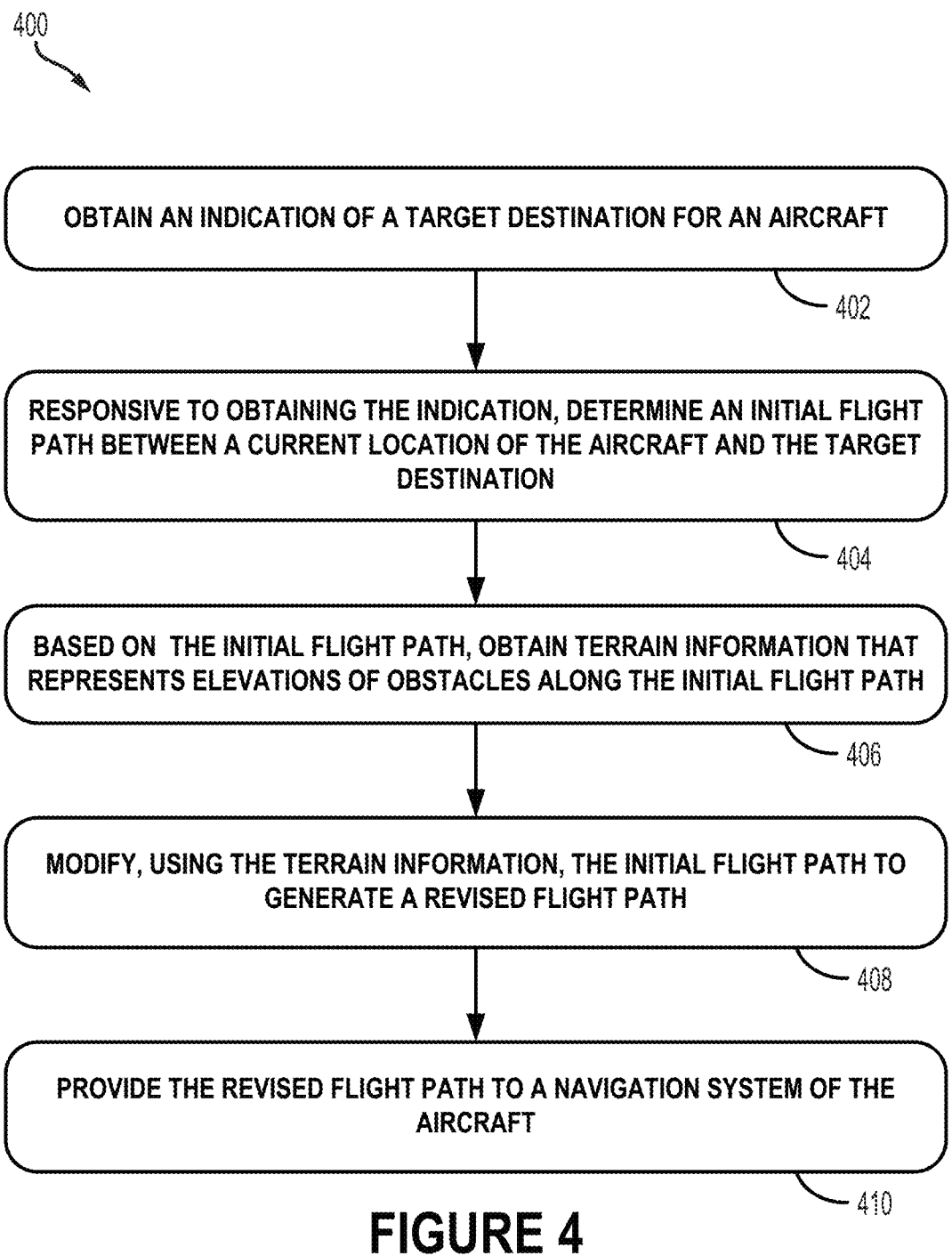
FIG. 4 shows a flowchart of a method, according to an example implementation.

FIG. 4 shows a flowchart of a method, according to an example implementation. The method 400 presents an example method for flight navigation path determination that could be used with the system 100 shown in FIG. 1 or performed by the FMS 102 shown in FIG. 2. In other examples, components of the devices and/or systems may be arranged to be adapted to, capable of, or suited for performing the functions, when operated in a specific manner. The method 400 may be performed using terrain information shown in FIG. 3.

The method 400 can include one or more operations, functions, or actions as illustrated by one or more of blocks 402, 404, 406, 408, and 410. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 402, the method 400 involves obtaining an indication of a target destination for an aircraft. A computing system, such as the FMS 102 shown in FIGS. 1-2, may be configured to determine a target destination for the aircraft. The FMS 102 may obtain the target destination from another computing system or from an input (e.g., from the pilot). In other examples, the FMS 102 may obtain the indication from another source.

At block 404, the method 400 involves responsive to obtaining the indication, determining an initial flight path between a current location of the aircraft and the target destination. The initial flight path may include a series of waypoints for guiding navigation of the aircraft along the initial flight path. The waypoints may serve as particular locations that a pilot or the aircraft's navigation system can follow to navigate according to the predefined flight path.

The FMS 102 may be configured to generate the initial flight path. As shown in FIG. 1, the FMS 102 may communicate with different sources (e.g., the performance database 104, the navigation database 106, and the weather forecasting system 108) to construct an initial flight path between the current location of the aircraft and the target destination. In some examples, the FMS 102 may receive the initial flight path from a flight path generator (e.g., a computing system).

At block 406, the method 400 involves based on the initial flight path, obtaining terrain information that represents elevations of obstacles along the initial flight path. The FMS 102 or another computing system may obtain terrain information, such as the terrain information shown in FIG. 3.

In some examples, the terrain information may include one or more digital elevation models arranged in a grid (e.g., the DEM 302 compiled into the grid 306). Particularly, each cell of the grid may represent a particular location and indicate respective elevations for one or more obstacles in the particular location. In some examples, the grid may only represent obstacles with respective elevations that exceed a predefined elevation above ground level (or sea level).

At block 408, the method 400 involves modifying, using the terrain information, the initial flight path to generate a revised flight path. The revised flight path may include one or more modifications to the series of waypoints of the initial flight path such that navigation of the revised flight path avoids one or more obstacles positioned along the initial flight path. As such, the one or more obstacles may have an elevation that exceeds an adjustable threshold elevation that depends on the initial flight path.

In some examples, the adjustable threshold elevation may depend on a set of elevations associated navigation of the initial flight path. For instance, the adjustable threshold elevation may vary depending on the area of navigation during the initial flight path such that the adjustable threshold elevation is lower during takeoff, descent, and landing areas.

Modifying the initial flight path may occur at various points. In some cases, the FMS 102 or another computing system may modify the initial flight path prior to the aircraft initiating flight. In turn, the aircraft may navigate the revised flight path during the entire route. For instance, the modification may occur during the initial development of the flight plan such that the generated flight plan factors and avoids potential elevated obstacles.

Alternatively, the FMS 102 or another computing system may modify the initial flight path during flight. Particularly, the FMS 102 may optimize the flight path to avoid elevated terrain while the aircraft navigates along the initial flight path in real-time. For instance, the FMS 102 may detect unfavorable conditions that render the current path of the aircraft less than ideal. To illustrate, detected high winds or another weather condition (e.g., low visibility) may trigger the FMS 102 to alert the pilot and determine one or more modifications to the current path to improve the overall safety of navigation.

In some examples, modifying the initial flight path may involve initially detecting that the aircraft is navigating towards a particular waypoint in the series of waypoints of the initial flight path. As such, the FMS 102 or another computing system may perform an analysis of a terrain between the particular waypoint and at least one subsequent waypoint in the series of waypoints of the initial flight path in response. Based on the analysis of the terrain, the FMS 102 may identify one or more obstacles with respective elevations that interfere with navigation of the aircraft between the particular waypoint and the subsequent waypoint. The FMS 102 may then modify the initial flight path to generate the revised flight path such that navigation of the revised flight path avoids the one or more obstacles. The FMS 102 may automatically be configured to routinely perform an analysis during navigation to detect and identify potential elevated obstacles (e.g., buildings, terrain) that may interfere with navigation. This way, the FMS 102 may automatically identify and propose modifications to maintain safe navigation as real-world conditions change during flight.

In some instances, modifying the initial flight path to generate the revised flight path such that navigation of the revised flight path avoids the one or more obstacles may involve modifying one or more waypoints such that navigation of the aircraft occurs at a different elevation between the waypoints. As a result, the aircraft may fly at a different elevation (e.g., a higher elevation) that avoids the detected potential obstacles. Alternatively, the modification may change the waypoints such that the aircraft navigates over a different area (e.g., a lateral modification) that does not include potential elevated obstacles. The modifications may cause the aircraft to navigate a path that is different in lateral movement and elevation in some examples.

In another example, modifying the initial flight path to generate the revised flight path may involve obtaining expected weather conditions for one or more areas between the current location of the aircraft and the target destination. In particular, the expected weather conditions obtained may correspond to a range of time when the aircraft is estimated to navigate the one or more areas during navigation between the current location of the aircraft and the target destination. As such, the FMS 102 or another computing system may identify an unfavorable expected weather conditions (e.g., rain, fog, snow) for a particular area of the one or more areas between the current location of the aircraft and the target destination. The FMS 102 may then modify the initial flight path to generate the revised flight path such that navigation of the revised flight path avoids the particular area.

Modifying the initial flight path may be based on other factors or a combination of factors within examples. For instance, the FMS 102 may select modifications to the initial flight path based on one or more of an engine type of the aircraft or capabilities of the aircraft, fuel available, and weather conditions of nearby areas. Some aircrafts may be able to perform maneuvers or navigate at elevations that other aircrafts are unable. As a result, the FMS 102 may factor the performance capabilities when determining modifications to avoid potential obstacles.

At block 410, the method 400 involves providing the revised flight path to a navigation system of the aircraft. The revised flight path may be provided along with an alert that represents one or more modifications to the initial flight path to enable a pilot or system to easily identify changes made to the initial flight path. The alert may be a visual, audio, or audiovisual alert that indicates a change to the initial flight path. In some instances, the alert may correspond to a tactile alert.

In some examples, providing the revised flight path may involve causing the navigation system to display a visual representation that depicts respective differences between the initial flight path and the revised flight path. For instance, the FMS 102 may provide a "suggested" modification that the pilot can approve or reject. In some cases, the navigation system may only show the revised flight path. In further examples, the FMS or another system may provide the revised flight path to an air traffic controller.

In some example implementations, the FMS 102 or another computing system may obtain the indication of the target destination for the aircraft prior to the aircraft initiating flight and determine the initial flight path prior to the aircraft initiating flight. As such, modifying the initial flight path to generate the revised flight path may also occur prior to the aircraft initiating flight. Particularly, the FMS 102 may optimize the flight path to avoid elevated objects within the underlying terrain prior to the aircraft initiating flight.

Figure 5A:
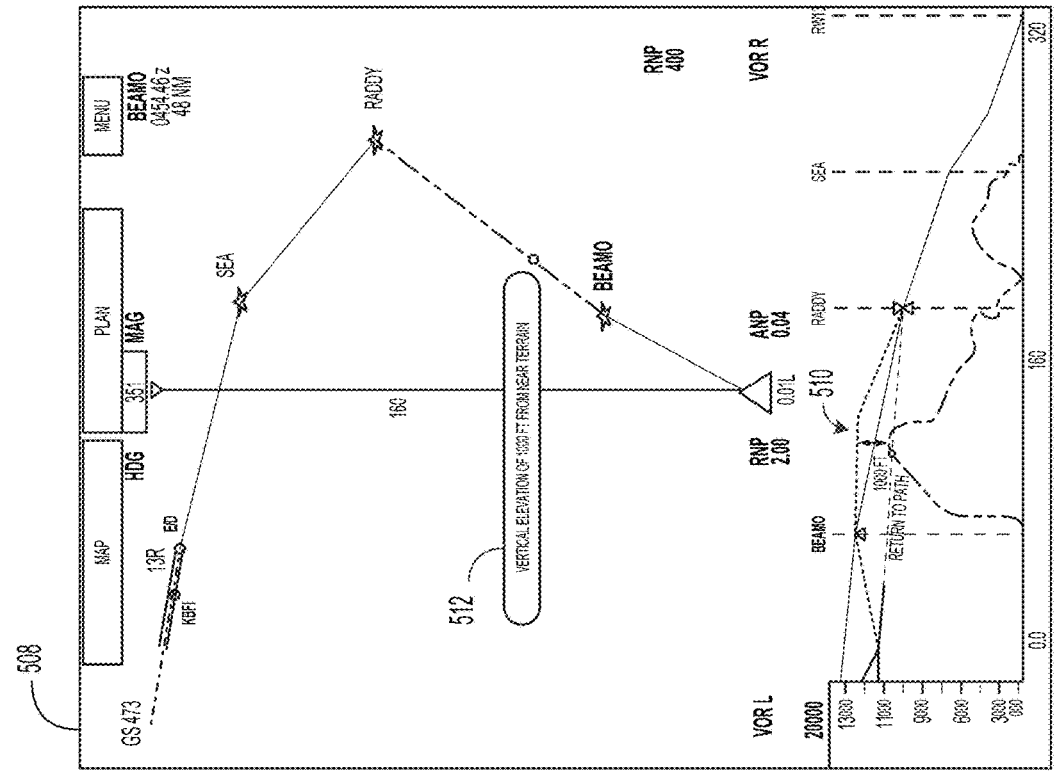
FIG. 5A illustrates a first visual representation that shows elevated terrain interfering with navigation of an initial flight path due to unplanned winds, according to an example implementation.
Figure 5B:
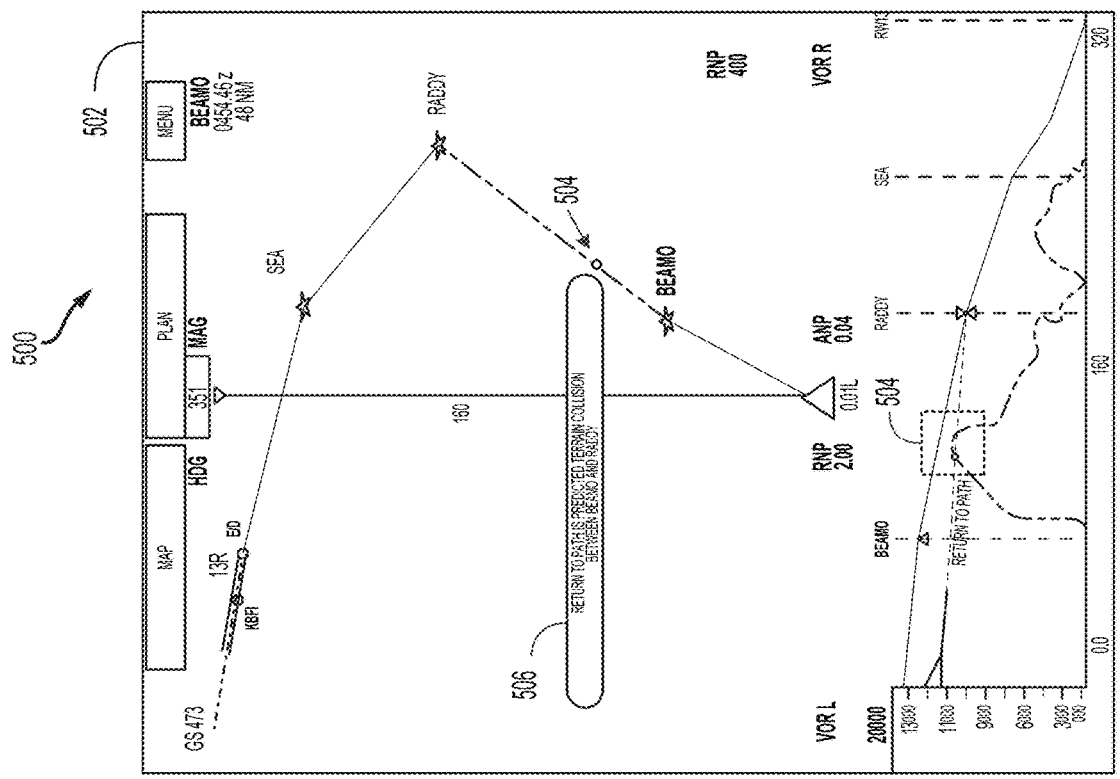
FIG. 5B illustrates a second visual representation that shows a revised flight path that avoids the elevated terrain, according to an example implementation.

In another example, the method 400 may further involve responsive to obtaining the terrain information, identifying a particular obstacle having an elevation that interferes with navigation of the initial flight path. Based on identifying the particular obstacle, the method 400 may further involve providing an indication that represents the particular obstacle via the navigation system of the aircraft. For instance, the FMS 102 may provide a proposed modification to the initial flight path. The proposed modification may enable the aircraft to avoid the particular obstacle during navigation. As such, the FMS 102 may await response from a pilot or another source prior to modifying the current flight path. For instance, the FMS 102 may receive an approval of the proposed modification to the initial flight path via the navigation system of the aircraft and modify the initial flight path to generate the revised flight path responsive to receiving the approval. Here, modifying the initial flight path may involve incorporating the proposed modification to the initial flight path into the revised flight path FIGS. 5A and 5B depict a mid-flight scenario that involves unplanned winds creating a potential terrain obstacle, according to an example implementation. In the scenario 500, the aircraft's current navigation path is disrupted by high winds. Particularly, the aircraft is approaching the descent and the winds have pushed the aircraft off the current navigation to extent that a correction back to the path by the pilot increases the chance that the aircraft collides with elevated terrain. Thus, the aircraft's FMS or another computing system may determine that the situation requires alerting the pilot to prevent continued navigation towards the elevated terrain.

FIG. 5A illustrates a first visual representation 502 that conveys that current path of the aircraft, the detected elevated terrain 504, and an alert 506 to inform the pilot of the detected situation. The FMS may display the alert 506 to inform the pilot that a return to the original flight path may place the aircraft on a path towards elevated terrain. This alert 506 may be useful to ensure that the pilot is aware of the situation. As such, the pilot may receive the alert 506 with enough time to decide upon an alternative route that avoids the terrain. In some instances, the FMS may provide the alternative route as shown in FIG. 5B.

FIG. 5B illustrates a second visual representation 508 that conveys a revised flight path for the aircraft. Particularly, the second visual representation 508 includes a vertical modification 510 as represented in the alert 512, which conveys that the pilot should maintain a vertical elevation of 1000 feet when navigating over the upcoming terrain. This way, the aircraft may safely avoid elevated terrain in the aircraft's current path by modifying the aircraft's flight path. Particularly, the FMS may adjust the current path via increasing and maintaining the aircraft's elevation at 1000 feet while crossing over the particular area with the elevated terrain. Thus, in the scenario 500, the FMS may resolve the situation and avoid the terrain by utilizing the vertical modification 510 that modifies the vertical path of the aircraft.

Figures 6A, 6B:
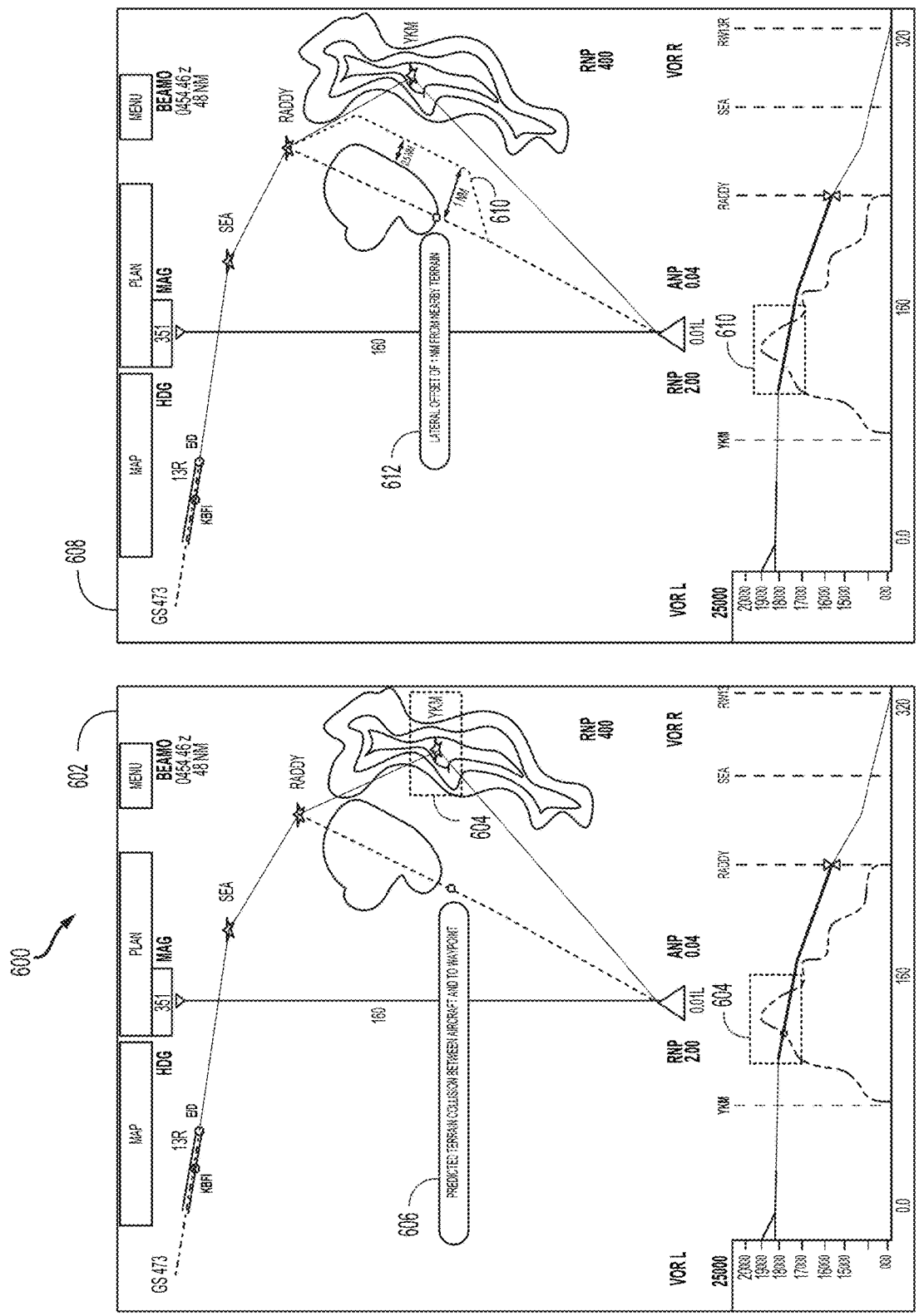
FIG. 6A illustrates a first visual representation that shows elevated terrain interfering with navigation of an initial flight path, according to an example implementation.
FIG. 6B illustrates a second visual representation that shows a revised flight path that incorporates a lateral modification to modify the path of the aircraft and avoid the elevated terrain, according to an example implementation.

FIGS. 6A and 6B depict another mid-flight scenario that involves unplanned winds creating a potential terrain obstacle situation. Similar to the scenario 500, the scenario 600 shows an aircraft approaching the descent phase of the flight with unplanned winds decreasing the safety of the original path as the aircraft approaches the YKM waypoint. By monitoring weather conditions and terrain information, the FMS may detect elevated terrain in the aircraft's current path and alert the pilot accordingly. Particularly, FIG. 6A illustrates a first visual representation 602 that conveys the current path of the aircraft, the detected elevated terrain 604, and an alert 606 to inform about the detected elevated terrain.

FIG. 6B illustrates a second visual representation 608 that conveys a revised flight path for the aircraft. The revised flight path incorporates a lateral modification 610 that effectively avoids both the terrain located at waypoint YKM and the terrain located directly between the current position of the aircraft and waypoint RADDY. As such, the lateral modification 610 may be conveyed to the pilot (or navigation system) via the alert 612.

Figure 7B:
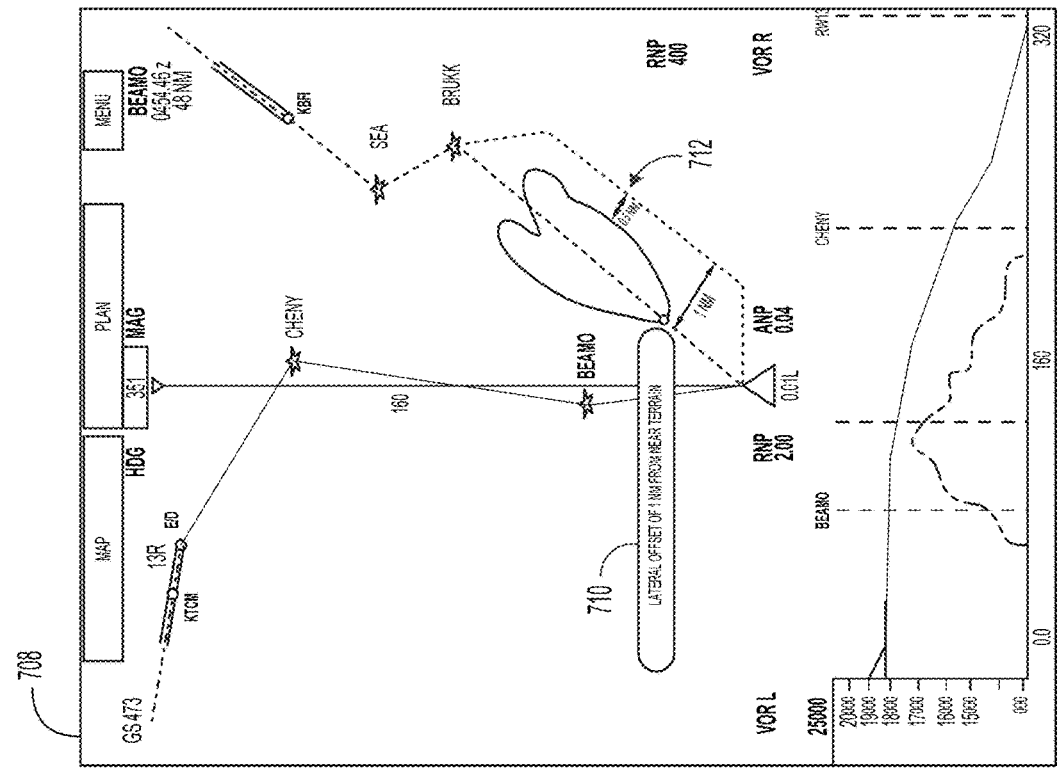
FIG. 7B illustrates a second visual representation showing a revised flight path to the alternate airport that avoids the elevated terrain, according to the example implementation.
Figure 7A:
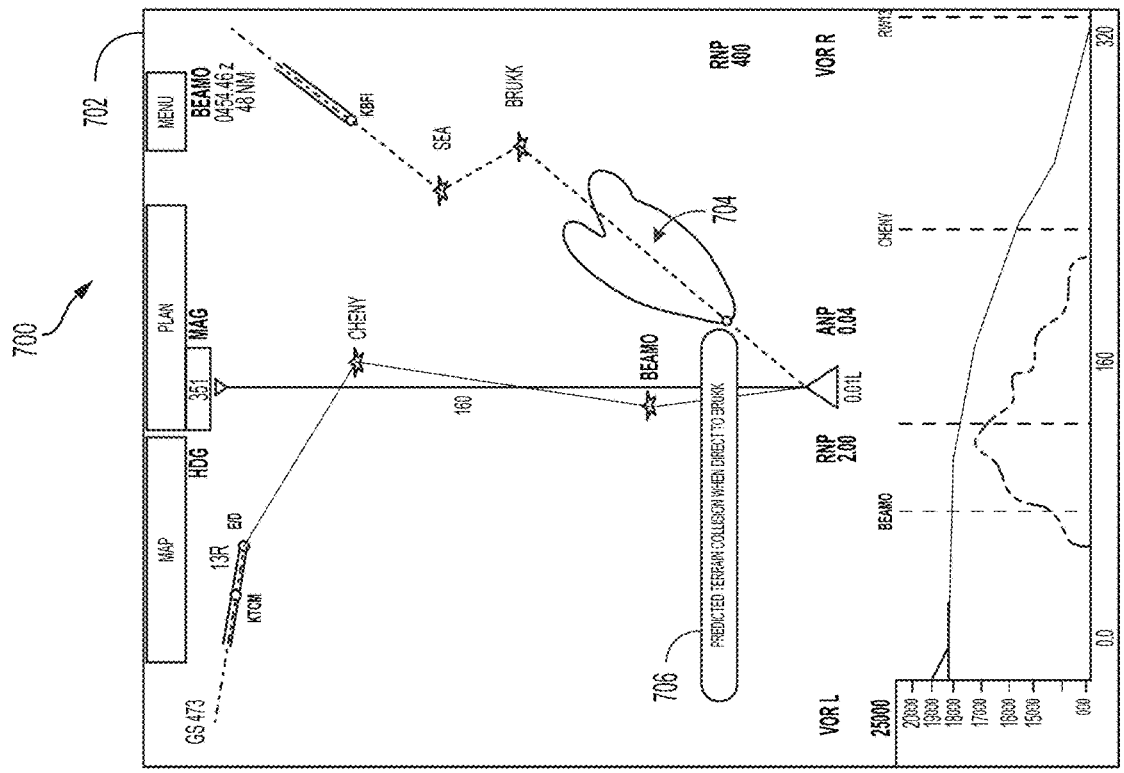
FIG. 7A illustrates a first visual representation that shows elevated terrain interfering with navigation of a current flight path directed towards an alternate airport, according to an example implementation.

FIGS. 7A and 7B depict yet another mid-flight scenario involving a change in destination airport resulting in potential terrain interference. Particularly, undesirable weather at the original target airport (KTCM airport) has caused the aircraft to switch to landing at an alternate airport (KBFI airport). This change in the current path of the aircraft has created a situation where terrain may undesirably interfere with navigation. FIG. 7A illustrates a first visual representation 702 that conveys that the terrain 704 positioned between the aircraft's current location and waypoint BRUKK creates a terrain situation if the aircraft continues to navigate its current path as indicated by alert 706.

FIG. 7B illustrates a second visual representation 708 that conveys a revised flight path for the aircraft. Particularly, the revised flight path incorporates a lateral modification 712 to avoid the terrain 704. As such, the lateral modification 712 may be conveyed to the pilot (or navigation system) via the alert 710. Thus, the FMS may provide the alert 710 to represent that performance of the lateral offset (i.e., the lateral modification 712) avoids the terrain 704.

Figure 8B:
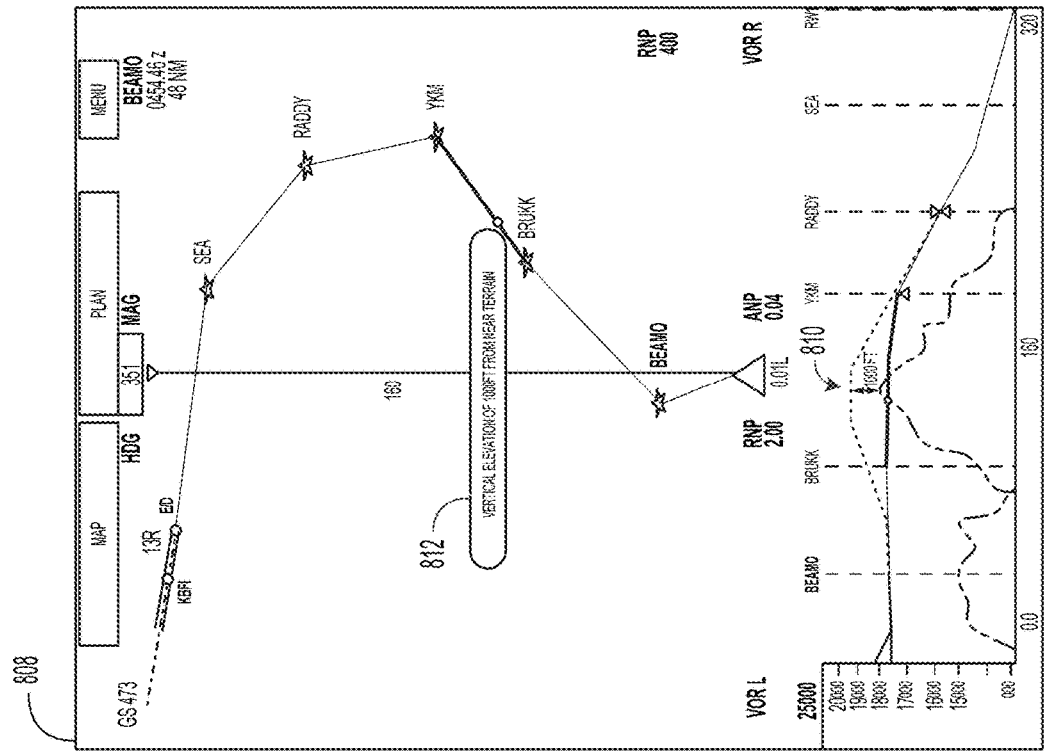
FIG. 8B illustrates a second representation that shows a revised flight path that incorporates a vertical modification to avoid the elevated terrain, according to the example implementation.
Figure 8A:
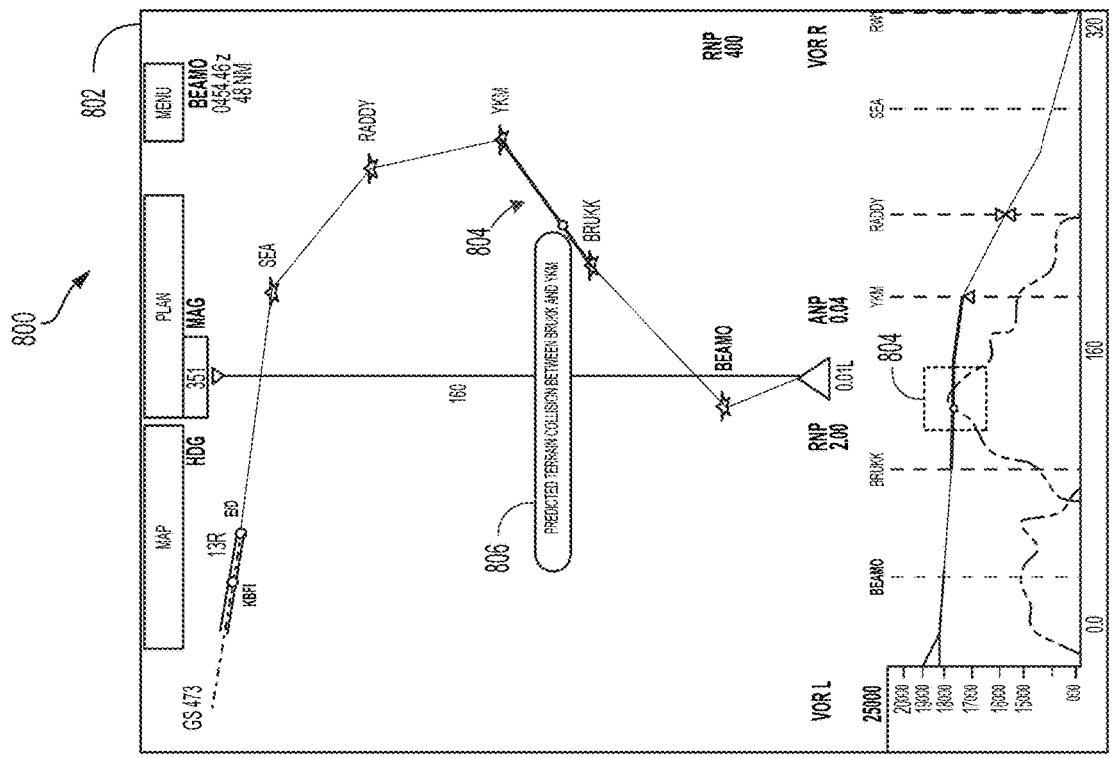
FIG. 8A illustrates a first representation that shows elevated terrain interfering with navigation of a descent flight path, according to an example implementation.

FIGS. 8A and 8B depict a further mid-flight scenario involving modifying the flight path to avoid terrain during descent. Elevated terrain may interfere with the aircraft's current path due to dynamic winds altering the initial flight path. Particularly, the dynamic winds may adjust the aircraft's current path to an extent that elevated terrain interferes with the flight's current path above a threshold likelihood. FIG. 8A illustrates a first visual representation 802 that conveys that the terrain 804 between waypoint BRUKK and waypoint YKM may interfere with navigation of the aircraft's current path. The first visual representation 802 includes the alert 806 that can convey the presence of the terrain to a pilot or the navigation system of the aircraft.

FIG. 8B illustrates a second representation 808 that conveys a revised flight path for the aircraft. The revised flight path incorporates a vertical modification 810 (e.g., 1000 feet) to avoid the elevated terrain. As such, the second representation 808 also includes an alert 812 that represents the vertical modification 810 that alters the vertical path of the aircraft.

Figure 9B:
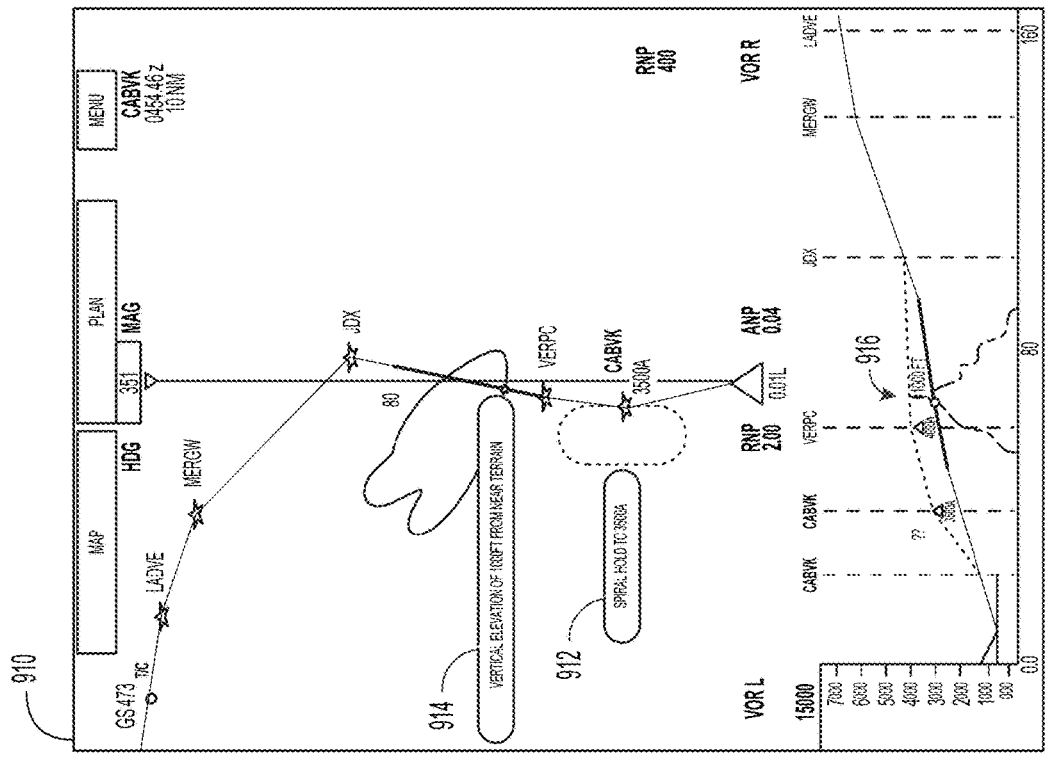
FIG. 9B illustrates a second representation that shows a revised flight path that avoids the elevated terrain via a vertical modification in the vertical path of the aircraft, according to an example implementation.
Figure 9A:
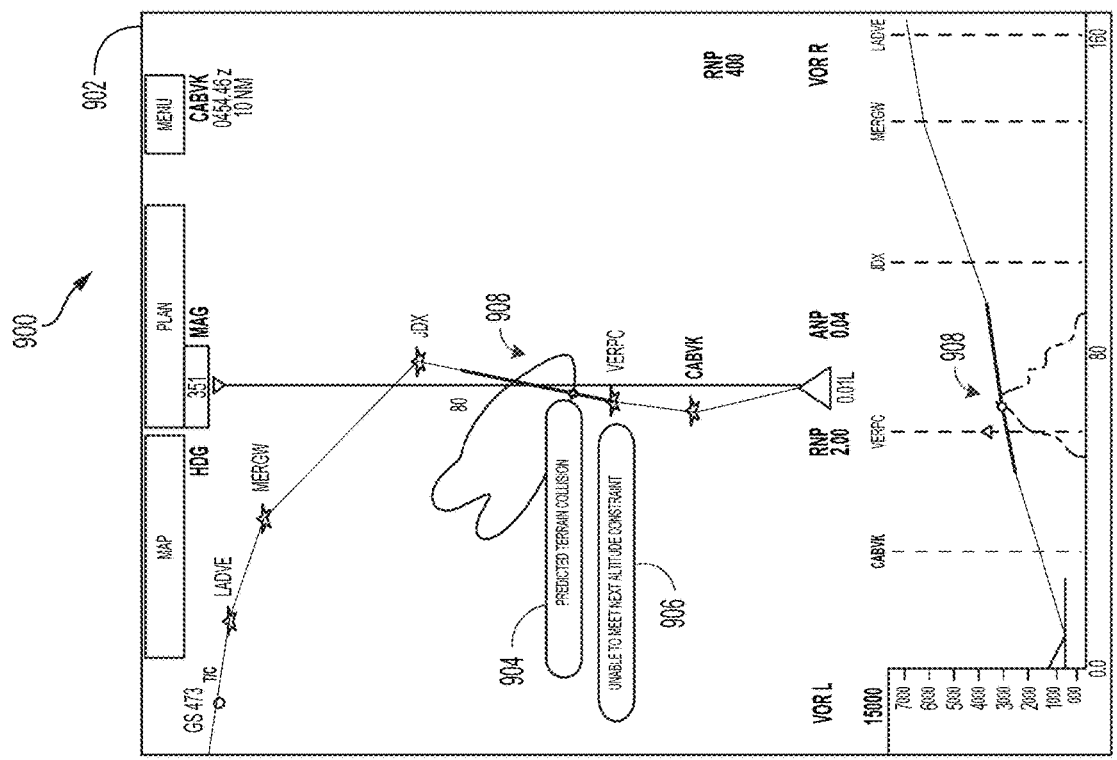
FIG. 9A illustrates a first representation that shows elevated terrain interfering with the current flight path due to head winds, according to an example implementation.

FIGS. 9A and 9B depict another mid-flight scenario that involves modifying the flight path during the execution of a go around after a missed approach in order to avoid terrain. In particular, due to head winds, the vertical climb elevation performed by the aircraft may not be able to meet the next altitude constraint in the scenario 900. As a result, the aircraft's FMS may determine that there is a possibility of elevated terrain interfering with the current path of the aircraft and alert the pilot in response. FIG. 9A illustrates a first visual representation 902 that conveys that the terrain 908 between waypoint VERPC and JDX may interfere with navigation of the aircraft's current path. The first visual representation 902 includes a first alert 904 and a second alert 906. The first alert 904 may be used to inform the pilot about the upcoming terrain situation involving the terrain 908. The second alert 906 may inform the pilot that the aircraft is unable to meet the next altitude constraint.

FIG. 9B illustrates a second representation 910 that conveys modifications to the flight path to avoid the terrain 908. Particularly, the modifications include a spiral operation to increase altitude enough in a proximate location to navigate over the terrain 908 using a vertical modification 916. As such, the second representation includes a first alert 912 that conveys for the pilot to perform the spiral move to increase altitude proximate waypoint CABVK and a second alert 914 to navigate over the terrain 908 at a vertical elevation of 1000 feet from waypoint VERPC to waypoint JDX.

Figure 10B:
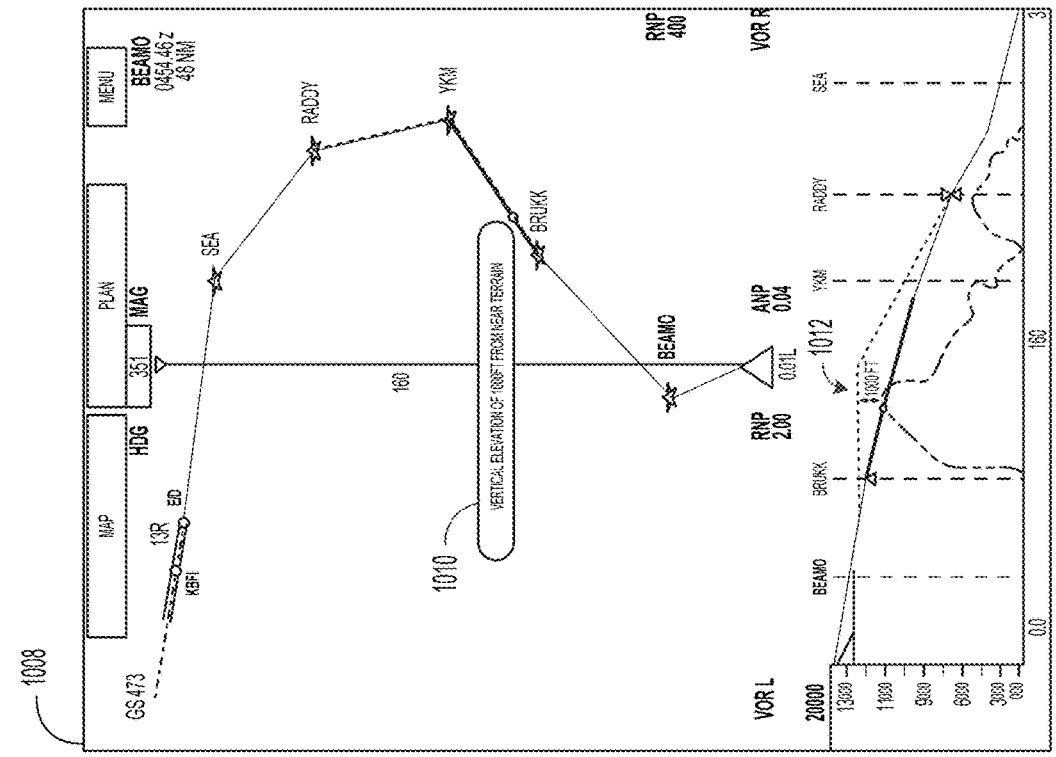
FIG. 10B illustrates a second representation that represents a revised flight plan that avoids the elevated terrain using a vertical modification to adjust the vertical path of the aircraft, according to an example implementation.
Figure 10A:
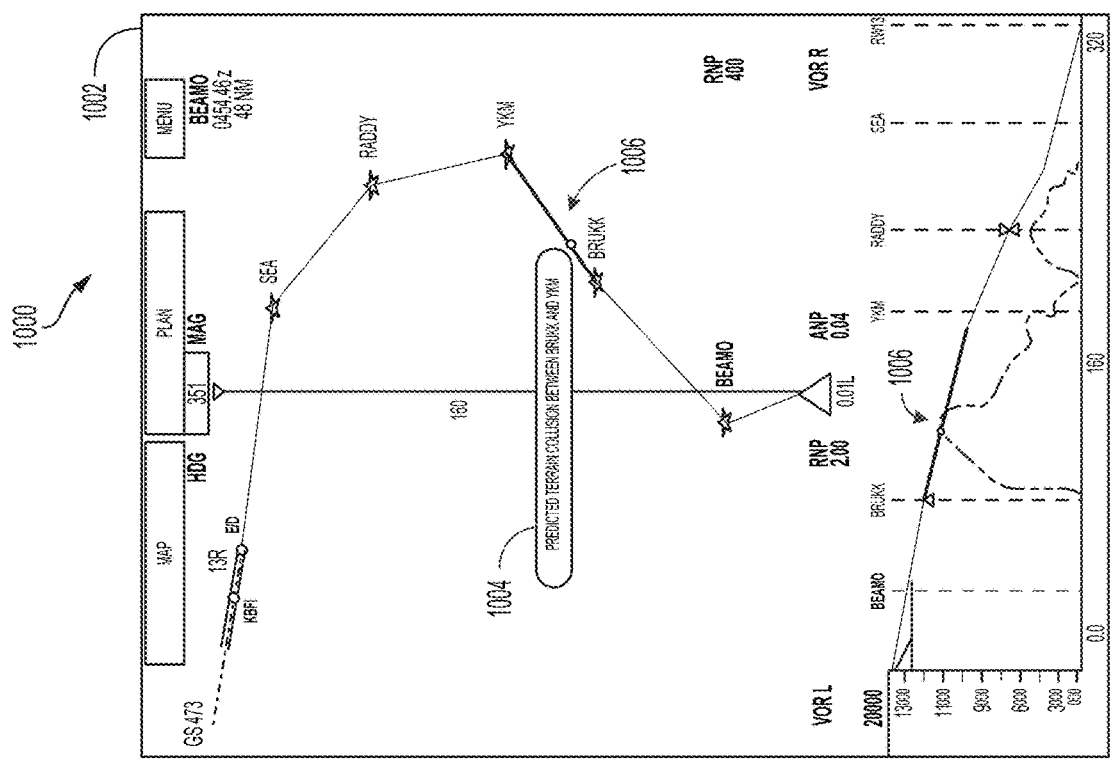
FIG. 10A illustrates a first representation that shows elevated terrain interfering with an aircraft's current flight path, according to an example implementation.

FIGS. 10A and 10B depict a further mid-flight scenario that involves modifying an initial flight plan in response to detecting elevated terrain within a threshold range of the flight path within the initial flight plan. The scenario 1000 shows a situation where the aircraft is in the descent phase of the initial flight plan. Due to pilot entered altitude constraints, elevated terrain is detected within the current flight path. As a result, the aircraft's FMS may detect the potential interference of the elevated terrain and provide a revised flight path.

FIG. 10A illustrates a first representation 1002 that shows elevated terrain 1006 interfering with the current flight path of the aircraft, according to an example implementation. Due to weather conditions and current traffic limitations, the pilot may decide to navigate the aircraft according to a descent with a particular altitude between waypoints. This altitude, however, may encounter interference from the terrain 1006 located in between waypoint BRUKK and waypoint YKM. As a result, the FMS may detect the elevated terrain 1006 and alert the pilot accordingly via alert 1004.

FIG. 10B illustrates a second representation 1008 that represents a revised flight plan that avoids elevated terrain via a vertical modification 1012, according to an example implementation. The second representation 1008 includes alert 1010, which may convey the vertical modification 1012 to the pilot or the aircraft's navigation system. The vertical modification 1012 may modify the vertical path of the aircraft.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for flight navigation path determination comprising:
    obtaining, at a computing system, an indication of a target destination for an aircraft, wherein the computing system is a flight management system of the aircraft;
    responsive to obtaining the indication, determining an initial flight path between a current location of the aircraft and the target destination, wherein the initial flight path includes a series of waypoints for guiding navigation of the aircraft along the initial flight path;
    based on the initial flight path, obtaining, by the computing system, terrain information that represents elevations of obstacles along the initial flight path;
    during navigation of the initial flight path by the aircraft, obtaining, by the computing system, weather data that indicates an unfavorable weather condition present in an upcoming segment of the initial flight path;
    determining, by the computing system, whether the unfavorable weather condition increases a likelihood of collision with at least one obstacle above a threshold likelihood during subsequent navigation of the upcoming segment of the initial flight path;
    responsive to determining the unfavorable weather condition increases the likelihood of collision with at least one obstacle above the threshold likelihood, modifying, by the computing system using the terrain information, the initial flight path to generate a revised flight path and providing an audiovisual alert that represents information about the revised flight path, wherein the computing system automatically generates the revised flight path to include one or more modifications to the series of waypoints of the initial flight path such that navigation of the revised flight path avoids the at least one obstacle, and wherein the audiovisual alert includes one or more text-based descriptions representing one or more modifications to the series of waypoints that are included in the revised flight path and an audio alert; and
    based on receiving an approval for the revised flight path, controlling, by the computing system, the aircraft according to the revised flight path.

2. The method of claim 1, wherein obtaining the indication of the target destination for the aircraft comprises:
   obtaining the indication of the target destination for the aircraft prior to the aircraft initiating flight; and
   wherein determining the initial flight path between the current location of the aircraft and the target destination comprises:
   determining the initial flight path prior to the aircraft initiating flight.

3. The method of claim 2, wherein modifying the initial flight path to generate the revised flight path comprises:
   modifying the initial flight path to generate the revised flight path prior to the aircraft initiating flight.

4. The method of claim 1, wherein the terrain information includes one or more digital elevation models arranged in a grid, wherein each cell of the grid represents a particular location and indicates respective elevations for one or more obstacles in the particular location.

5. The method of claim 4, wherein the grid only represents obstacles with respective elevations that exceed a predefined elevation above ground level and wherein the adjustable threshold elevation depends on a set of elevations associated with navigation of the initial flight path.

6. The method of claim 1, wherein modifying the initial flight path to generate the revised flight path comprises:
   modifying the initial flight path to generate the revised flight path during navigation of the aircraft along the initial flight path.

7. The method of claim 6, wherein modifying the initial flight path to generate the revised flight path comprises:
   detecting that the aircraft is navigating towards a particular waypoint in the series of waypoints of the initial flight path;
   responsive to detecting that the aircraft is navigating towards the particular waypoint, performing an analysis of a terrain between the particular waypoint and at least one subsequent waypoint in the series of waypoints of the initial flight path;
   based on the analysis of the terrain, identifying one or more obstacles with respective elevations that interfere with navigation of the aircraft between the particular waypoint and the at least one subsequent waypoint; and
   modifying the initial flight path to generate the revised flight path such that navigation of the revised flight path avoids the one or more obstacles.

8. The method of claim 7, wherein modifying the initial flight path to generate the revised flight path such that navigation of the revised flight path avoids the one or more obstacles comprises:
   modifying the particular waypoint and the at least one subsequent waypoint such that navigation of the aircraft occurs at a different elevation between the particular waypoint and the at least one subsequent waypoint.

9. The method of claim 7, wherein modifying the initial flight path to generate the revised flight path such that navigation of the revised flight path avoids the one or more obstacles comprises:
   modifying a location of one or both of the particular waypoint and the at least one subsequent waypoint such that navigation of the aircraft between the particular waypoint and the at least one subsequent waypoint extends over an area without the one or more obstacles.

10. The method of claim 1, further comprising:
   providing the revised flight path to an air traffic controller.

11. The method of claim 1, wherein modifying the initial flight path to generate the revised flight path is further based on an engine type of the aircraft.

12. The method of claim 1, wherein providing the revised flight path to the navigation system of the aircraft comprises:
   causing the navigation system of the aircraft to display a visual representation that depicts respective differences between the initial flight path and the revised flight path.

13. The method of claim 1, further comprising:
   responsive to obtaining the terrain information, identifying a particular obstacle having an elevation that interferes with navigation of the initial flight path; and
   based on identifying the particular obstacle, providing an indication that represents the particular obstacle via the navigation system of the aircraft.

14. The method of claim 13, wherein providing the indication of the particular obstacle via the navigation system of the aircraft comprises:
   providing a proposed modification to the initial flight path, wherein the proposed modification enables the aircraft to avoid the particular obstacle during navigation; and
   wherein modifying the initial flight path to generate the revised flight path comprises:
   receiving an approval of the proposed modification to the initial flight path via the navigation system of the aircraft; and
   modifying the initial flight path to generate the revised flight path responsive to receiving the approval, wherein modifying the initial flight path involves incorporating the proposed modification to the initial flight path into the revised flight path.

15. A system for flight navigation path determination of an aircraft comprising:
   a database having terrain information;
   a computing device corresponding to a flight management system of the aircraft, wherein the computing device is configured to:
   obtain an indication of a target destination for the aircraft;
   responsive to obtaining the indication, determine an initial flight path between a current location of the aircraft and the target destination, wherein the initial flight path includes a series of waypoints for guiding navigation of the aircraft along the initial flight path;
   based on the initial flight path, obtain the terrain information that represents elevations of obstacles along the initial flight path;
   during navigation of the initial flight path by the aircraft, obtain weather data that indicates an unfavorable weather condition present in an upcoming segment of the initial flight path;
   determine whether the unfavorable weather condition increases a likelihood of collision with at least one obstacle above a threshold likelihood during subsequent navigation of the upcoming segment of the initial flight path;
   responsive to determining the unfavorable weather condition increases the likelihood of collision with at least one obstacle above the threshold likelihood, modify, using the terrain information, the initial flight path to generate a revised flight path and provide an audiovisual alert that represents information about the revised flight path, wherein the computing device automatically generates the revised flight path to include one or more modifications to the series of waypoints of the initial flight path such that navigation of the revised flight path avoids the at least one obstacle, and wherein the audiovisual alert includes one or more text-based descriptions representing the one or more modifications to the series of waypoints that are included in the revised flight path and an audio alert; and based on receiving an approval for the revised flight path, control the aircraft according to the revised flight path.

16. The system of claim 15, wherein modifying, using the terrain information, the initial flight path to generate the revised flight path comprises:

modifying a vertical path of the initial flight path to generate the revised flight path.

17. The system of claim 15, wherein modifying, using the terrain information, the initial flight path to generate the revised flight path comprises:

modifying a lateral path of the initial flight path to generate the revised flight path.

18. A non-transitory computer-readable medium configured to store instructions, that when executed by one or more processors, cause a computing system to perform functions comprising:

obtaining an indication of a target destination for an aircraft, wherein the computing system is a flight management system of the aircraft;

responsive to obtaining the indication, determining an initial flight path between a current location of the aircraft and the target destination, wherein the initial flight path includes a series of waypoints for guiding navigation of the aircraft along the initial flight path;

based on the initial flight path, obtaining terrain information that represents elevations of obstacles along the initial flight path;

during navigation of the initial flight path by aircraft, obtaining weather data that indicates an unfavorable weather condition present in an upcoming segment of the initial flight path;

determining whether the unfavorable weather condition increases a likelihood of collision with at least one obstacle above a threshold likelihood during subsequent navigation of the upcoming segment of the initial flight path;

responsive to determining the unfavorable weather condition increases the likelihood of collision with at least one obstacle above the threshold likelihood, modifying, using the terrain information, the initial flight path to generate a revised flight path and providing an audiovisual alert that represents information about the revised flight path, wherein the computing system automatically generates the revised flight path to include one or more modifications to the series of waypoints of the initial flight path such that navigation of the revised flight path avoids the at least one obstacle, and wherein the audiovisual alert includes one or more text-based descriptions representing the one or more modifications to the series of waypoints that are included in the revised flight path and an audio alert; and based on receiving an approval for the revised flight path, controlling the aircraft according to the revised flight path.

19. The method of claim 1, wherein the likelihood of collision is based on a comparison between respective flight elevations for the upcoming segment of the initial flight path and elevations of one or more objects located along the upcoming segment of the initial flight path.

20. The method of claim 1, wherein providing the audiovisual alert that represents information about the revised flight path further comprises:

providing one or more subsequent audio alerts periodically until receiving a pilot input.

* * * * *